US008060274B2

(12) United States Patent  (10) Patent No.: US 8,060,274 B2
Boss et al.  (45) Date of Patent: Nov. 15, 2011

(54) LOCATION-BASED VEHICLE MAINTENANCE SCHEDULING

(75) Inventors: Gregory J. Boss, American Fork, UT (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/261,326

(22) Filed: Oct. 30, 2008

(65) Prior Publication Data

US 2010/0114423 A1   May 6, 2010

(51) Int. Cl.
*G08G 1/123* (2006.01)
(52) U.S. Cl. .......................................... 701/30; 340/994
(58) Field of Classification Search ................. 701/300, 701/207, 201, 30; 340/539.24, 426.21, 438, 340/994
See application file for complete search history.

(56) References Cited

U.S. PATENT DOCUMENTS

| 5,761,326 | A | * | 6/1998 | Brady et al. .................. 382/103 |
| 6,049,269 | A | | 4/2000 | Byrd et al. |
| 6,262,656 | B1 | | 7/2001 | Byrd et al. |
| 6,370,454 | B1 | * | 4/2002 | Moore ............................ 701/29 |
| 6,677,854 | B2 | | 1/2004 | Dix |
| 6,836,710 | B2 | | 12/2004 | Yamaki |
| 6,933,842 | B2 | | 8/2005 | Oesterling et al. |
| 6,948,171 | B2 | * | 9/2005 | Dan et al. ...................... 718/100 |
| 7,024,291 | B2 | | 4/2006 | Sudou |
| 7,031,717 | B2 | | 4/2006 | Mazzara |
| 7,035,731 | B2 | * | 4/2006 | Smith ........................... 701/207 |
| 7,191,058 | B2 | | 3/2007 | Laird et al. |
| 7,469,827 | B2 | * | 12/2008 | Katragadda et al. .......... 235/384 |
| 2005/0119030 | A1 | | 6/2005 | Bauchot et al. |
| 2005/0162256 | A1 | | 7/2005 | Kinoshita |
| 2005/0222755 | A1 | * | 10/2005 | Tengler et al. ................ 701/201 |
| 2006/0229928 | A1 | * | 10/2006 | Nix, Jr. ............................ 705/9 |
| 2008/0054072 | A1 | * | 3/2008 | Katragadda et al. .......... 235/384 |

* cited by examiner

*Primary Examiner* — Thomas Black
*Assistant Examiner* — Marthe Marc-Coleman
(74) *Attorney, Agent, or Firm* — Patrick J. Daugherty; Driggs, Hogg, Daugherty & Del Zoppo Co., LPA

(57) ABSTRACT

Systems, methods, and program products are provided for scheduling vehicle maintenance by identifying a future location at which a vehicle is available for a service and electronically providing at least the future location, a time and time duration that the vehicle is estimated to be at the future location, and an identified service, to a mechanic.

23 Claims, 2 Drawing Sheets

LOCATION-BASED VEHICLE MAINTENANCE SCHEDULING

FIELD OF THE INVENTION

The present invention generally relates to vehicle maintenance scheduling and, more particularly, to a method, system, and program product for scheduling vehicle maintenance based on a location of the vehicle at which the vehicle is available to be serviced.

BACKGROUND OF THE INVENTION

Vehicles such as cars, trucks, motorcycles, and the like use various wearable components and fluids that break down over time and/or with use and, thus, should be serviced. As such, vehicle manufacturers have provided a maintenance schedule for a vehicle with information such as how often the vehicle should be serviced. For example, the maintenance schedule may specify how often various fluids and/or components should be replaced, cleaned, adjusted, inspected, etc.

In addition, vehicles have included a fault detection system with visual indicators such as lights and meters that notify an owner when the vehicle should be serviced. Examples of such indicators include a check engine light, a lower oil pressure light, a charging system light, a brake system light, a temperature gauge, etc. Maintenance of some wearable components such as tires, windshield washer blades, etc. have been specified by the manufacturer of the component and/or determined through visual inspection.

Vehicle owners often take their vehicles to a mechanic for service rather than perform the maintenance on the vehicle themselves. Unfortunately, the owner may not always be aware of when their vehicle needs service. For instance, the owner may not remember or know that a component should be replaced after 50,000 miles, which may not be reached for 2 or more years after the purchase of the vehicle. Even when the owner is aware that the vehicle should be serviced, the owner has to locate a mechanic that performs the particular type of service and find the time to bring the vehicle to the mechanic. Moreover, the owner often has to wait at the service station until the service is completed or otherwise find temporary transportation. In some cases, the mechanic must bear the liability and expense of providing such temporary transportation.

SUMMARY OF THE INVENTION

In general, the present invention provides a system, method, and program product for identifying a likely location of the vehicle at which the vehicle is available for servicing. In one instance, this is accomplished by tracking the location of the vehicle and predicting where the vehicle is likely to be located and for how long based on the tracked information. Additionally or alternatively, the prediction is based on a schedule provided by the user of the vehicle that indicates where the user and, thus, the vehicle is likely to be located. Such information can be used in conjunction with information related to a type of maintenance to be performed on the vehicle to generate a schedule showing a likely location at which the vehicle can be found for servicing. Such information can be provided to a mechanic or the like who can use the information to retrieve the vehicle and perform the service.

In one aspect, a system of a vehicle that generates and provides a location-based service schedule for the vehicle includes a location identifier that identifies a first parameter indicative of a likely future location of the vehicle at which the vehicle is available for maintenance and a notifier that selectively conveys the first parameter to one of a mechanic, a user of the vehicle, or a third party.

In another aspect, a method for scheduling vehicle maintenance includes identifying a type of service to be performed on a vehicle, predicting a future location and a time at which the vehicle is available for the service, generating a recommended location-based service schedule for the vehicle based on the future location, the time, and the type of service, and electronically sending the recommended location-based service schedule to a recipient.

In another aspect, a method includes producing computer executable program code, storing the code on a computer readable medium, providing the program code to be deployed and executed on a computer system. The program code comprising instructions which, when executed on the computer system, cause the computer system to: identify a first parameter indicative of a likely future location of a vehicle at which the vehicle is available for servicing and transmit the first parameter to at least one of a mechanic, a user of the vehicle, or a third party.

In another aspect, a method for deploying an application for scheduling vehicle service includes providing a computer infrastructure being operable to: electronically communicate with a computer of a vehicle, identify a first parameter indicative of a type of service to be performed on the vehicle via the electronic communication, identify a second parameter indicative of a likely future location and time of the vehicle at which the vehicle is available for the service, and provide the first and second parameter to a service recipient.

BRIEF DESCRIPTION OF THE DRAWINGS

These and other features of this invention will be more readily understood from the following detailed description of the various aspects of the invention taken in conjunction with the accompanying drawings in which.

Figure 1:
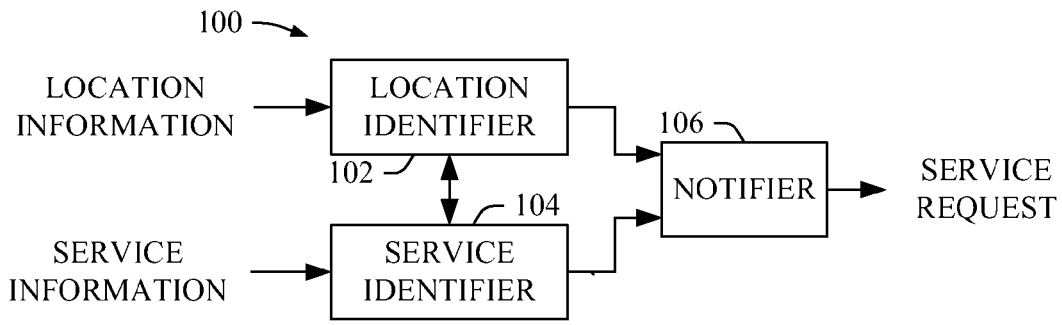
FIG. 1 illustrates a system for scheduling vehicle service.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description
II. Computerized Implementation

I. General Description

Conventionally, owners of vehicles are tasked with becoming apprised of when their vehicle should be serviced, selecting a mechanic, finding time to bring the vehicle to the mechanic, dropping off the vehicle with the mechanic, and picking up the vehicle after the service is performed. The present invention provides a system, method, and program product for identifying a likely location of the vehicle at which the vehicle can be found for servicing. When it is determined that the vehicle should be serviced, the location information as well as other information such as the type of service can be conveyed to a mechanic or the like who can use the information to retrieve the vehicle and perform the service.

FIG. 1 illustrates a system 100 of a vehicle that generates and provides a location-based service schedule for the vehicle. The system 100 may reside in and/or operate in conjunction with a vehicle such as a car, a truck, a motorcycle, a boat, or the like. For example, the system 100 may be part of or operate in conjunction with the vehicle's computing system, the vehicle's computer, fault detection system, and/or various components within one or more sub-systems of the vehicle. Portions of the system 100 may also be located external from the vehicle, for example, in a computer, a mobile computing device, a cell phone, a component of a network, etc. at a service station, the owner's house, etc.

A location identifier 102 identifies a future location at which the vehicle is likely to be throughout any day, a first parameter indicative of a likely future location of the vehicle at which the vehicle is available for service or maintenance, a second parameter indicative of a time and time duration that the vehicle is estimated to be at the future location, and/or a time and time duration that the vehicle is estimated to be at the future location. In one instance, the location identifier 102 obtains and aggregates vehicle location information over time, for example, over one or more days, for one or more months, and/or for one or more years. Additionally or alternatively, the location identifier 102 obtains information related to where the user expects to be throughout a day. The vehicle and/or user location information can be obtained by the location identifier 102 and/or provided to the location identifier 102 from a device external to the vehicle, a sub-system of the vehicle, and/or a component of the vehicle. For each location, this information may be associated with time related information, such as how long the vehicle and/or user will be at a location. The location identifier 102 may use the location and time information to generate a schedule predicting where the vehicle is likely to be found in the future during a day and estimate how long the vehicle is likely to be at the location.

A service identifier 104 identifies a type of service or maintenance that should be performed on the vehicle when it is determined that the vehicle should be serviced and/or a second parameter indicative of a type of service to perform on the vehicle. In one instance, the service identifier 104 obtains information indicative of the type of maintenance to be performed from the vehicle, for example, from a component of the vehicle and/or the vehicle's fault sensing system and/or indicia such as a service flag or the like. Additionally or alternatively, the service identifier 104 may obtain such information from a maintenance schedule. This information can be obtained from a device external to the vehicle and stored in memory and/or other information storage device. The service identifier 104 may use the above information to identify the type of maintenance as well as recommend additional maintenance to be performed along with the identified type of maintenance. Examples of suitable maintenance include replacing, cleaning, adjusting, checking, inspecting, etc. various fluids and/or components.

A notifier 106 conveys the first parameter, the second parameter, the location information and/or the service information to a suitable recipient via a wire or wireless communication channel. In one instance, this may include sending a service request to one or more mechanics and/or one or more service stations, an auction house where mechanics can bid on or otherwise accept the service request, a broker that pre-negotiated service costs, a user of the vehicle, a third party, and/or other recipient. A recipient may be determined based on the location and/or service information, as well as other information, such as a preference of the user. The notifier 106 may also filter the information, and/or convey the filtered information to the recipient.

The recipient of the service request may contact the vehicle user to confirm or change the service appointment. For instance, an appointment may need to be changed based on a mechanic's schedule, the mechanic's estimated time to complete the service, etc. Likewise, the vehicle user can contact the recipient to change any of the information in the service request. Furthermore, the user and the recipient may communicate to make arrangements regarding obtaining a key and/or key code, deactivating an alarm, billing for the service, and/or other information related to the service. This information may also be provided in the service request.

The location identifier 102, the service identifier 104, and the notifier 106 can communicate with devices external to the vehicle and/or sub-systems of the vehicle through various communication channels. For instance, they can communicate over a wire such as through a serial communication port, a USB port, an Ethernet port, and the like, and/or wirelessly such as via a cell tower, an infrared port, a radio frequency transceiver, an optical port, and the like. Furthermore, such communication may include sending and/or receiving instructions, parameters, signals, etc.

Figure 2:
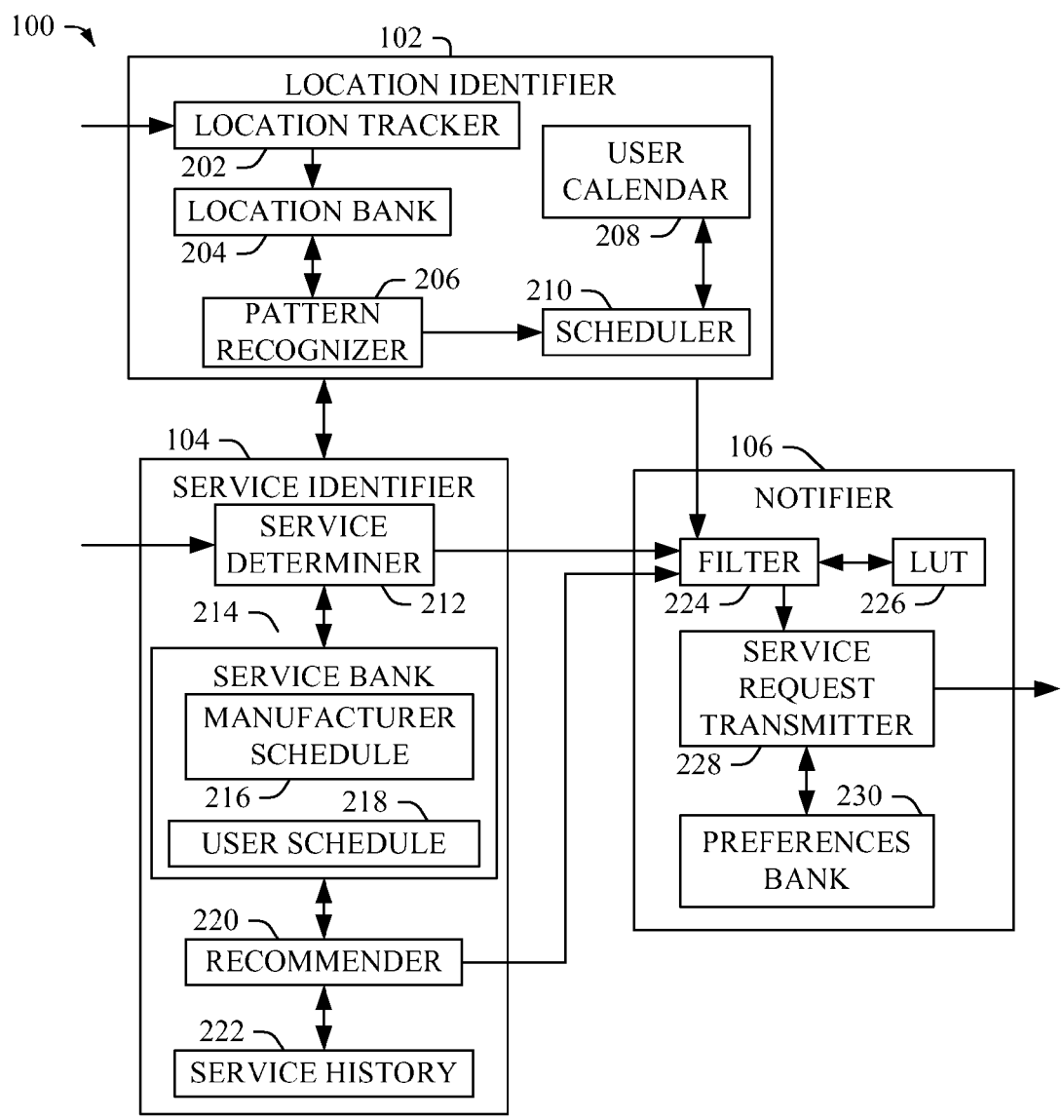
FIG. 2 illustrates an implementation of the system for scheduling vehicle service.

FIG. 2 depicts a non-limiting implementation of the system 100. It is to be appreciated that other implementations are also contemplated herein. As noted above, the location identifier 102 identifies a location at which the vehicle is likely to be at in the future. As shown in the illustrated example, in one instance the location identifier 102 includes a location tracker 202 that tracks the location of the vehicle. The location tracker 202 can track the location of the vehicle over time to obtain tracked location information, wherein the future location is predicted based on the tracked location information. The location tracker 202 may include a global positioning receiver such as one that communicates with a global navigation satellite system, such as the global positioning system (GPS), and/or other navigational system.

The location information received by the location tracker 202 can be stored in a storage component such as a location bank 204. The location of the vehicle may be associated with information such as a day of the week, a time at which the vehicle arrives at a location, a time at which the vehicle leaves the location, a time duration at which the vehicle is at the location, and/or other time and/or non-time related information. This information and/or other information can be stored with the vehicle location information in the location bank 204.

A pattern recognizer 206 recognizes location patterns based on the location information in the location bank 204. In one instance, the pattern recognizer 206 recognizes location patterns in the tracked location information, wherein the future location is predicted based on the recognized location patterns. The pattern recognizer 206 may recognize that to a large extent, the vehicle is located within the same general area for an extended period of time each week. Such a pattern may correlate to when the owner of the vehicle is at work. The pattern recognizer 206 may weight recognized patterns based on the frequency at which the vehicle is at a location. Such weighting may correspond to a confidence level and/or likelihood that the pattern will be repeated. In one example, the higher the weight, the more likely it is that the pattern will be repeated, and the lower the weight, the less likely it is that the pattern will be repeated. It is to be appreciated that the pattern recognizer 206 may use machine learning based on a priori knowledge and/or statistical or probabilistic information extracted from the patterns. Various algorithms can be employed, such as, for example, Bayesian classifiers, neural networks, and/or the like.

Additionally or alternatively, the location identifier 102 may obtain a user calendar 208. The user calendar 206 may include an electronic calendar that includes indicia indicative of where the user is and, thus, the vehicle is likely to be throughout one or more days. For example, the calendar may include indicia indicative of when the user expects to be at work during the coming week and the location of the employer. Additionally or alternatively, the electronic calendar may include indicia indicative of when the vehicle is unlikely to be available. For example, the calendar may include indicia indicative of when the owner expects to be in transit. A storage component stores a user calendar that includes information indicative of a future location of a user, wherein the future location of the vehicle is predicted based on the user calendar.

A scheduler 210 generates a schedule predicting the location of the vehicle, indicative of future locations of the vehicle, including times at which the vehicle is estimated to be at each future location, for performing an identified service, and/or other information. The schedule may be based on the location information, the location pattern information, and/or the user calendar 208. In one instance, the scheduler 210 compares the location pattern and the user calendar 208 and determines whether there are any conflicts between the location pattern and the calendar 208. This information may also be used when generating the schedule. For instance, the location pattern may indicate that the vehicle is likely to be at location A from 9 am to 5 pm on Mondays. However, the calendar 208 may show that the user has indicated that on a particular Monday, the vehicle will be elsewhere. As such, the scheduler 210 may ignore the potential conflict, mark the location as questionable, or not include the location.

The scheduler 210 provides the schedule to the notifier 106, which can conveys the schedule to the one of the mechanic, the user of the vehicle, or the third party. This may occur when it is determined that the vehicle should be serviced and/or otherwise. As noted below, in one instance the service identifier 104 prompts the location identifier 102 when service should be performed, and the scheduler 210 generates and conveys the schedule in response thereto.

The service identifier 104 includes a service determiner 212 that determines the type of maintenance that should be performed. For instance, as noted above the service identifier 104 may communicate with the vehicle's fault system. As such, when a fault condition is recognized by the vehicle, the service determiner 212 is notified of the fault. The information may include a signal or service flag indicative of the fault. For instance, a particular service flag or signal may indicate that there may be a problem with the oil system. In one instance, the service determiner 212 is able to obtain and/or determine more detailed information is available, such as the oil pressure is outside of a preset range, the oil pump has failed, etc.

Additionally or alternatively, the service determiner 212 communicates with a service bank 214, which may include a manufacturer maintenance schedule, which is defined by the manufacturer, and/or an owner maintenance schedule, which is defined by the owner. By way of example, a manufacturer schedule 216 may include the maintenance schedule provided by the manufacturer such as the schedule typically found in the owner's manual. The owner schedule 218 may include the service milestones set by the owner such as when to have an emissions test, replace the windshield wipers, etc.

The service determiner 212 may periodically check the manufacturer schedule 216 and/or the owner schedule 218 to see if a service milestone has been reached.

When the service determiner 212 determines the service should be performed, based on a signal from the vehicle and/or the service bank 214, the service determiner 212 provides this information to the notifier 106. As shown, the service determiner 212 may invoke the location identifier 102 to generate and provide the location schedule when the service determiner 212 determines the service should be performed. In other instances, the location identifier 102 continuously, periodically or otherwise provides a location schedule to the notifier 106 and/or polls the service identifier 104 to determine when to generate and convey a location schedule.

The service determiner 104 optionally includes a recommender 220 that recommends other service(s) based on the manufacturer schedule 216, the owner schedule 218, and/or a service history 222. For instance, the recommender 220 may recommend changing the oil since manufacturer schedule 216 indicates that the oil needs to be changed within the next 100 miles. A threshold for a service can be set so that the recommender can determine when and when not to recommend a service be performed early. In one instance, the recommender 220 may compute a cost and/or utility metric to the user associated with performing the service earlier than scheduled, and determine whether to recommend the service based on the cost and/or utility metric.

In another instance, the recommender 220 may recommend replacing the windshield wiper blades since the user schedule 218 indicates that they should be replaced before winter. Once replaced, user schedule can be updated so that the recommender 220 does not recommend replacing the windshield wiper blades until the following year. In yet another instance, the recommender 220 may recommend rotating and/or balancing the tires when replacing the break pads since, historically, the user has rotated and/or balanced the tires when the break pads were replaced. The recommended service, if any, is provided to the notifier 106 along with the service to be performed.

The notifier 106 optionally includes a filter 224 that filters the location schedule based on the service to be performed. For instance, the filter 224 may use a look up table (LUT) to determine an estimated time for the service. If the service is estimated to take longer than the time in which the vehicle is estimated to be at a location, the location may be removed or otherwise marked as such since the service potentially cannot be completed when the vehicle is at the location. Upon filtering such locations, the filter 224 may determine whether a recommended service can be performed in conjunction with the required service at a particular location. If the recommended service cannot be performed at any of the locations, the filter ignores or otherwise marks the recommended service as such.

A service request transmitter 228 transmits the location schedule and/or the filtered location schedule and the service information, including the service to be performed and the recommended service, to the recipient. The service request transmitter 228 may determine a suitable recipient based on information stored in a preferences bank 230 that indicates at least a recipient of the first parameter. Such information may include a particular mechanic, a service station, a third party, and/or other information related to selecting the recipient. Other information stored in the preference bank 230 may include a method of payment, billing information, contact information such as a telephone number, an email address, a cell phone number, etc., a manufacturer of parts, a particular grade of product (e.g., SAE number, synthetic oil, additive, etc.), a particular type of product (e.g., rebuild or new), etc.

It is to be appreciated that an updated location schedule and/or a confirmation may be subsequently provided to the recipient, as needed. The service history 222 can be updated to include the service performed. In addition, the user schedule 206, the manufacturer schedule 216, the owner schedule 218, the LUT 226, and/or the preference bank 236 can be updated to reflect any changes.

Figure 3:
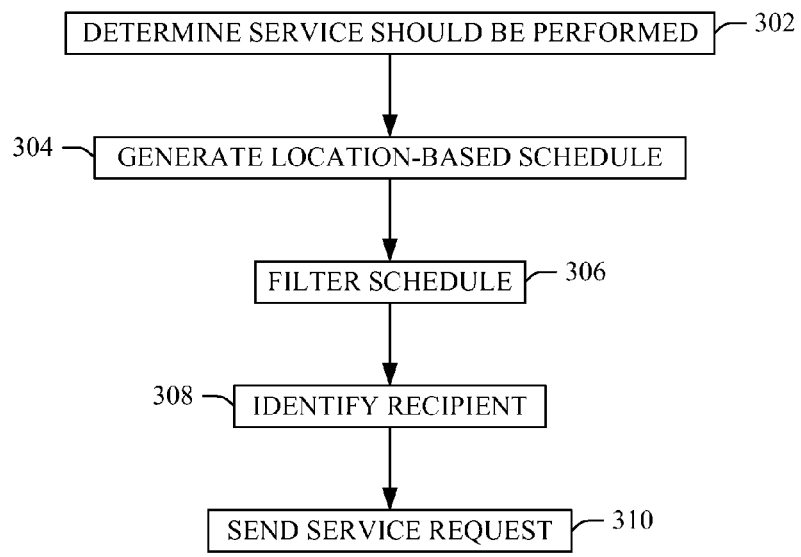
FIG. 3 illustrates a method for scheduling vehicle service.

FIG. 3 illustrates a method for scheduling vehicle service based on the location of the vehicle. At 302, the system 100 determines that the vehicle should be serviced. As noted above, this may be determined when the vehicle's fault detection system has detected a potential fault, a milestone indicating that a particular service should be performed has been reached, etc. At 304, a location-based schedule is generated. As noted above, such a schedule may include a predicted location of the vehicle, including an estimated time duration at which the vehicle is at the location. Also noted above, the schedule may be generated based on a location pattern of the vehicle and/or a user's schedule.

At 306, the schedule is optionally filtered based on the type of service. As noted above, this may include determining whether the type of service can be performed while the vehicle is at a predicted location. As such, if the service is estimated to take longer than the vehicle is estimated to be at the location, that location can be removed from the schedule. At 308, a recipient(s) of the schedule and service related information including a type of service is identified. User preferences and/or other information may be utilized to determine the recipient. At 310, the system transmits the schedule and service related information to the recipient. As noted above, the recipient and user may communicate regarding the location, service, and/or related matters. Based on the location and service information, the vehicle can be found when it is available for a service and the service can then be performed.

A method for scheduling vehicle maintenance includes identifying a type of service to be performed on a vehicle, predicting a future location and a time at which the vehicle is available for the service, generating a recommended location-based service schedule for the vehicle based on the future location, the time, and the type of service, and electronically sending the recommended location-based service schedule to a recipient. The method further includes comparing an estimated time of the service with a time duration in which the vehicle is predicted to be at the location, and sending the recommended location-based service schedule when the estimated time of the service is less then the time duration.

The method further includes tracking location information of the vehicle and predicting future locations at which the vehicle is available for the service based on the tracked location information of the vehicle. The location information of the vehicle is obtained from a global navigational system. The method further includes electronically sending at least one of user contact information or user billing information to the recipient. The method further includes determining a recommended second service to be performed in conjunction with the service and electronically sending the recommended second service to the recipient. The recommended second service is based on at least one of a service history of the vehicle, a manufacturer maintenance schedule, or a user maintenance schedule. The method further includes determining the future location based on at least one of location pattern information for the vehicle or a calendar of the user.

A method includes producing computer executable program code, storing the code on a computer readable medium, and providing the program code to be deployed and executed on a computer system. The program code comprises instructions which, when executed on the computer system, cause the computer system to: identify a first parameter indicative of a likely future location of a vehicle at which the vehicle is available for servicing and transmit the first parameter to at least one of a mechanic, a user of the vehicle, or a third party. In one instance, the computer system is a computing system of the vehicle. The program code may further comprise instructions which, when executed on the computer system, cause the computer system to: identify a second parameter indicative of a type of service to be performed on the vehicle and transmit the second parameter to the at least one of the mechanic, the user of the vehicle, or the third party. The program code may further comprise instructions which, when executed on the computer system, cause the computer system to: generate a service schedule based on the first and second parameters, wherein the service schedule identifies a future vehicle location at which the vehicle is estimated to be at long enough for the service to be performed while the vehicle is at the location and transmit the service schedule to the at least one of the mechanic, the user of the vehicle, or the third party.

A method for deploying an application for scheduling vehicle service includes providing a computer infrastructure being operable to: electronically communicate with a computer of a vehicle, identify a first parameter indicative of a type of service to be performed on the vehicle via the electronic communication, identify a second parameter indicative of a likely future location and time of the vehicle at which the vehicle is available for the service and provide the first and second parameter to a service recipient. In one instance, the computer infrastructure is further operable to: generate a location pattern of the vehicle using a machine learning algorithm, wherein the first parameter is based on the location pattern.

II. Computerized Implementation

Figure 4:
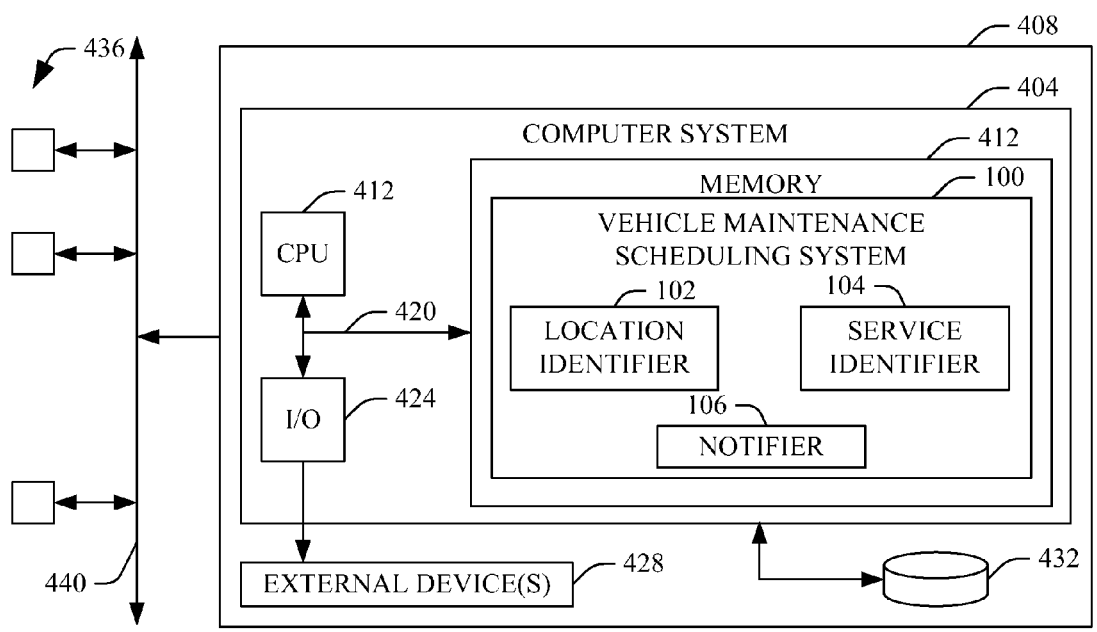
FIG. 4 illustrates an exemplary computerized implementation of the vehicle service scheduling system.

Referring now to FIG. 4, an exemplary computerized implementation includes a computer system 404 deployed within a computer infrastructure 408 such as one existing with the vehicle described above. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 408 is intended to demonstrate that some or all of the components of implementation could be deployed, managed, serviced, etc. by a service provider who offers to implement, deploy, and/or perform the functions of the present invention for others.

As shown, the computer system 404 includes a processing unit 412, a memory 416, a bus 420, and input/output (I/O) interfaces 424. Further, the computer system 404 is shown in communication with external I/O devices/resources 428 and storage system 432. In general, the processing unit 412 executes computer program code, such as the code to implement various components of the system 100, which is stored in memory 416 and/or storage system 432. It is to be appreciated that two or more, including all, of these components may be implemented as a single component.

While executing computer program code, the processing unit 412 can read and/or write data to/from the memory 416, the storage system 432, and/or the I/O interfaces 424. The bus 420 provides a communication link between each of the components in computer system 404. The external devices 428 can comprise any devices (e.g., keyboard, pointing device, display, etc.) that enable a user to interact with computer system 404 and/or any devices (e.g., network card, modem, etc.) that enable computer system 404 to communicate with one or more other computing devices.

The computer infrastructure 408 is only illustrative of various types of computer infrastructures for implementing the invention. For example, in one embodiment, computer infrastructure 408 comprises two or more computing devices (e.g., a server cluster) that communicate over a network to perform the various process steps of the invention. Moreover, computer system 404 is only representative of various possible computer systems that can include numerous combinations of hardware.

To this extent, in other embodiments, computer system 404 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 412 may comprise a single processing unit, or be distributed across one or more processing units in one or more locations, e.g., on a client and server. Similarly, the memory 416 and/or the storage system 432 can comprise any combination of various types of data storage and/or transmission media that reside at one or more physical locations.

Further, I/O interfaces 424 can comprise any system for exchanging information with one or more of the external device 428. Still further, it is understood that one or more additional components (e.g., system software, math co-processing unit, etc.) not shown in FIG. 4 can be included in computer system 404. However, if computer system 404 comprises a handheld device or the like, it is understood that one or more of the external devices 428 (e.g., a display) and/or the storage system 432 could be contained within computer system 404, not externally as shown.

The storage system 432 can be any type of system (e.g., a database) capable of providing storage for information under the present invention. To this extent, the storage system 432 could include one or more storage devices, such as a magnetic disk drive or an optical disk drive. In another embodiment, the storage system 432 includes data distributed across, for example, a local area network (LAN), wide area network (WAN) or a storage area network (SAN) (not shown). In addition, although not shown, additional components, such as cache memory, communication systems, system software, etc., may be incorporated into computer system 404.

Shown in the memory 416 of computer system 404 is the vehicle maintenance scheduling system 100, which includes the location identifier 102, the service identifier 104, and the notifier 106. In another implementation, these components, including all of the components, can be a single component. These components perform the functions discussed above. More particularly, the location identifier 102 may predict a location at which the vehicle is available for service, the service identifier 104 may identify the type of service(s) to perform, and the notifier 106 provides this information to a suitable recipient. In the illustrated embodiment, the system 100 communicates with external entities 436 such as another computing system, an electronic schedule, another vehicle, a service station computer, other apparatuses external to the vehicle, etc. over a path 440, which may be wired (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to schedule vehicle maintenance. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 416 (FIG. 4) and/or the storage system 432 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage the vehicle maintenance scheduling system 100. In this case, the service provider can create, maintain, support, etc., a computer infrastructure, such as the computer infrastructure 408 (FIG. 4) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the vehicle maintenance scheduling system 100. In this case, a computer infrastructure, such as computer infrastructure 408 (FIG. 4), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 404 (FIG. 4), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system of a vehicle that generates and provides a location-based service schedule for the vehicle, comprising:
    a location identifier that:
        predicts a likely future location of the vehicle and a time during a day and a duration time at which the vehicle is available for maintenance;
        identifies a type of service to be performed on the vehicle and an estimated time for performing the service;
        compares the estimated time for performing the type of service with the duration time at which the vehicle is predicted to be available for the service at the time during the day at the future location; and
        generates a recommended location-based service schedule for the vehicle based on the predicted future location, the duration time at which the vehicle is predicted to be available for the service at the future location at the time during the day, and the type of service, by removing the predicted future location from the recommended location-based service schedule if the time for performing the service is estimated to take longer than the duration time at which the vehicle is estimated to be at the predicted future location; and
    a notifier that selectively conveys the recommended location-based service schedule to a mechanic to retrieve the vehicle from the predicted future location at the time during the day and perform the service on the day if the time for performing the service is not estimated to take longer than the duration time at which the vehicle is estimated to be at the predicted future location.

2. The system of claim 1, wherein the system is part of the vehicle's computing system.

3. The system of claim 1, wherein the notifier conveys the recommended location-based service schedule over one of a wire or wireless communication channel.

4. The system of claim 1, wherein the notifier further sends a service request to a plurality of mechanics for bidding upon the request.

5. The system of claim 1, wherein the type of service is based on information provided by at least one of a fault detection system of the vehicle, an electronic manufacturer maintenance schedule, and an electronic user maintenance schedule, wherein the electronic maintenance schedules are stored in a storage component operative to the service identifier.

6. The system of claim 1, wherein the location identifier predicts the likely future location based on tracked location information from a location tracker that tracks the location of the vehicle over time.

7. The system of claim 6, further including a pattern recognizer that recognizes location patterns in the tracked location information, wherein the location identifier predicts the likely future location based on the recognized location patterns.

8. The system of claim 1, further including a storage component that stores a user calendar with information indicative of a future location of a user, wherein the location identifier predicts the likely future location of the vehicle based on the user calendar.

9. The system of claim 1, further including a preferences bank that indicates a recipient of the first parameter.

10. A method for scheduling vehicle maintenance, comprising:
    identifying a type of service to be performed on a vehicle and determining an estimated time for performing the service;
    predicting a future location of the vehicle and a time during a day and a duration time at which the vehicle is available for the service at the future location during the day;
    comparing the estimated time for performing the type of service with the duration time at which the vehicle is predicted to be available for the service at the time during the day at the future location;
    generating a recommended location-based service schedule for the vehicle based on the predicted future location, the duration time at which the vehicle is predicted to be available for the service at the future location at the time during the day, and the type of service, by removing the predicted future location from the recommended location-based service schedule if the time for performing the service is estimated to take longer than the duration time at which the vehicle is estimated to be at the predicted future location; and
    electronically sending the recommended location-based service schedule to a mechanic to retrieve the vehicle from the predicted future location at the time during the day and perform the service on the day if the time for performing the service is not estimated to take longer than the duration time at which the vehicle is estimated to be at the predicted future location.

11. The method of claim 10, wherein the step of electronically sending the recommended location-based service schedule to the mechanic further comprises:
    sending a service request to a plurality of mechanics for bidding upon the request.

12. The method of claim 10, further including tracking location information of the vehicle and predicting future locations at which the vehicle is available for the service based on the tracked location information of the vehicle.

13. The method of claim 12, wherein the location information of the vehicle is obtained from a global navigational system.

14. The method of claim 10, further including electronically sending at least one of user contact information or user billing information to the recipient.

15. The method of claim 10, further including determining a recommended second service to be performed in conjunction with the service and electronically sending the recommended second service to the recipient.

16. The method of claim 15, wherein the recommended second service is based on at least one of a service history of the vehicle, a manufacturer maintenance schedule, or a user maintenance schedule.

17. The method of claim 10, further including determining the future location based on at least one of location pattern information for the vehicle or a calendar of the user.

18. An article of manufacture, comprising:
    a computer readable storage device comprising computer executable program code stored thereon, the program code comprising instructions which, when executed on a computer system, cause the computer system to:
    identify a type of service to be performed on the vehicle and an estimated time for performing the service;

predict a likely future location of a vehicle and a time during a day and a duration time at which the vehicle is available for servicing;

compare the estimated time for performing the type of service with the duration time at which the vehicle is predicted to be available for the service at the time during the day at the future location;

generate a recommended location-based service schedule for the vehicle based on the predicted future location, the duration time at which the vehicle is predicted to be available for the service at the future location at the time during the day, and the type of service, by removing the predicted future location from the recommended location-based service schedule if the time for performing the service is estimated to take longer than the duration time at which the vehicle is estimated to be at the predicted future location; and transmit the recommended location-based service schedule to a mechanic to retrieve the vehicle from the predicted future location at the time during the day and perform the service on the day if the time for performing the service is not estimated to take longer than the duration time at which the vehicle is estimated to be at the predicted future location.

19. The article of manufacture of claim 18, wherein the computer system is a computing system of the vehicle.

20. The article of manufacture of claim 18, wherein the program code further comprises instructions which, when executed on the computer system, cause the computer system to:

predict the likely future location based on tracked location information from a location tracker that tracks the location of the vehicle over time.

21. The method of claim 20, wherein the program code further comprises instructions which, when executed on the computer system, cause the computer system to:

transmit the recommended location-based service schedule to the mechanic by transmitting a service request to a plurality of mechanics for bidding upon the request.

22. A method for deploying an application for scheduling vehicle service, comprising:

providing a computer infrastructure being operable to:

identify a type of service to be performed on a vehicle and an estimated time for performing the service;

predict a likely future location of the vehicle and a time during a day and a duration of time at which the vehicle is available for the service;

compare the estimated time for performing the type of service with the duration time at which the vehicle is predicted to be available for the service at the time during the day at the future location;

generate a recommended location-based service schedule for the vehicle based on the predicted future location, the duration time at which the vehicle is predicted to be available for the service at the future location at the time during the day, and the type of service, by removing the predicted future location from the recommended location-based service schedule if the time for performing the service is estimated to take longer than the duration time at which the vehicle is estimated to be at the predicted future location; and provide the recommended location-based service schedule to a mechanic to retrieve the vehicle from the predicted future location at the time during the day and perform the service on the day if the time for performing the service is not estimated to take longer than the duration time at which the vehicle is estimated to be at the predicted future location.

23. The method of claim 22, wherein the computer infrastructure is further operable to:

transmit the recommended location-based service schedule to the mechanic by transmitting a service request to a plurality of mechanics for bidding upon the request.

* * * * *